(12) United States Patent
Takeoka

(10) Patent No.: US 9,053,865 B2
(45) Date of Patent: *Jun. 9, 2015

(54) LAMINATED CERAMIC CAPACITOR

(75) Inventor: Shinsuke Takeoka, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 156 days.

This patent is subject to a terminal disclaimer.

(21) Appl. No.: 13/880,676

(22) PCT Filed: Sep. 26, 2011

(86) PCT No.: PCT/JP2011/071787
§ 371 (c)(1),
(2), (4) Date: Jun. 13, 2013

(87) PCT Pub. No.: WO2012/053316
PCT Pub. Date: Apr. 26, 2012

(65) Prior Publication Data
US 2014/0002955 A1 Jan. 2, 2014

(30) Foreign Application Priority Data
Oct. 20, 2010 (JP) .................................. 2010-235413

(51) Int. Cl.
*H01G 4/06* (2006.01)
*H01G 4/12* (2006.01)
(Continued)

(52) U.S. Cl.
CPC ............. *H01G 4/1227* (2013.01); *Y10T 29/435* (2015.01); *C04B 35/4682* (2013.01); *C04B 2235/3203* (2013.01); *C04B 2235/3208* (2013.01); *C04B 2235/3213* (2013.01);
(Continued)

(58) Field of Classification Search
USPC ................ 361/321.4, 311–313, 321.1, 321.2, 361/321.5, 306.1, 306.3
See application file for complete search history.

(56) References Cited

U.S. PATENT DOCUMENTS

| 2002/0037804 A1 | 3/2002 | Sugimoto et al. |
| 2008/0004172 A1 | 1/2008 | Kojima et al. |

(Continued)

FOREIGN PATENT DOCUMENTS

| JP | 2002-097072 A | 4/2002 |
| JP | 2005-194138 A | 7/2005 |

(Continued)

OTHER PUBLICATIONS

International Preliminary Report on Patentability issued by Patent Cooperation Treaty, mailed May 8, 2013, for PCT application No. PCT/JP2011/071787.

*Primary Examiner* — Nguyen T Ha
(74) *Attorney, Agent, or Firm* — Law Office of Katsuhiro Arai

(57) ABSTRACT

A dielectric ceramic composition is represented by $BaTiO_3 + aRe_2O_3 + bMnO + cV_2O_5 + dMoO_3 + eCuO + fB_2O_3 + gLi_2O + xSrO + yCaO$ (wherein Re represents one or more elements selected from among Eu, Gd, Dy, Ho, Er, Yb, and Y; and a-h each represents the mole number of each component with respect to 100 mol of the main component that is composed of $BaTiO_3$). When the molar ratio of $(Ba+Sr+Ca)/Ti$ contained in the dielectric ceramic composition is represented by m, the $0.10 \le a \le 0.50$, $0.20 \le b \le 0.80$, $0 \le c \le 0.12$, $0 \le d \le 0.07$, $0.04 \le c+d \le 0.12$, $0 \le e \le 1.00$, $0.50 \le f \le 2.00$, $0.6 \le (100(m-1)+2g)/2f \le 1.3$, and $0.5 \le 100(m-1)/2g \le 5.1$ are satisfied.

17 Claims, 1 Drawing Sheet

(51) Int. Cl.
  *C04B 35/468* (2006.01)
  *H01B 3/12* (2006.01)
  *H01G 4/30* (2006.01)
  *B32B 18/00* (2006.01)

(52) U.S. Cl.
  CPC . *C04B 2235/3224* (2013.01); *C04B 2235/3225* (2013.01); *C04B 2235/3239* (2013.01); *C04B 2235/3256* (2013.01); *C04B 2235/3262* (2013.01); *C04B 2235/3281* (2013.01); *C04B 2235/3409* (2013.01); *C04B 2235/3418* (2013.01); *C04B 2235/652* (2013.01); *C04B 2235/6582* (2013.01); *C04B 2235/6588* (2013.01); *C04B 2235/72* (2013.01); *C04B 2235/77* (2013.01); H01B 3/12 (2013.01); H01G 4/30 (2013.01); H01G 4/1209 (2013.01); B32B 18/00 (2013.01); *C04B 2235/6565* (2013.01); *C04B 2237/346* (2013.01); *C04B 2237/704* (2013.01); *C04B 2235/3215* (2013.01); *C04B 2235/3236* (2013.01); *C04B 2235/3267* (2013.01); *C04B 2235/79* (2013.01)

(56) References Cited

U.S. PATENT DOCUMENTS

| | | |
|---|---|---|
| 2008/0030921 A1 | 2/2008 | Kaneda et al. |
| 2008/0068777 A1 | 3/2008 | Takeoka |
| 2014/0009864 A1* | 1/2014 | Takashima et al. ........ 361/301.4 |

FOREIGN PATENT DOCUMENTS

| | | |
|---|---|---|
| JP | 2006-213575 A | 8/2006 |
| JP | 2007-331957 A | 12/2007 |
| JP | 2008-042150 A | 2/2008 |
| JP | 2008-072072 A | 3/2008 |
| WO | 2012043427 A1 | 4/2012 |
| WO | 2012120712 A1 | 9/2012 |

* cited by examiner

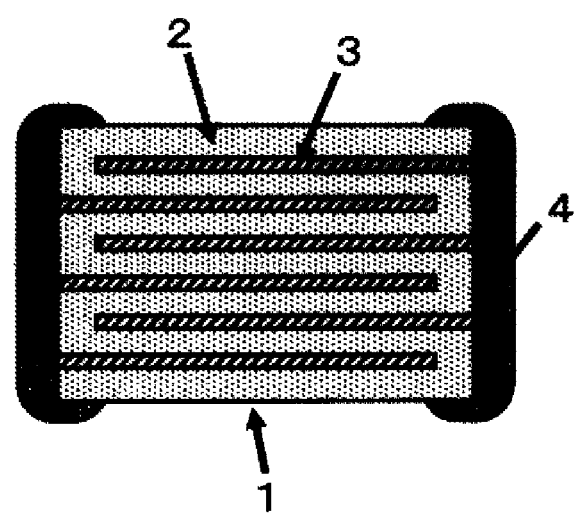

LAMINATED CERAMIC CAPACITOR

This application is the U.S. National Phase under 35 U.S.C. §371 of International Application PCT/JP2011/071787, filed Sep. 26, 2011, which claims priority to Japanese Patent Application No. 2010-235413, filed Oct. 20, 2010. The International Application was published under PCT Article 21(2) in a language other than English.

TECHNICAL FIELD

The present invention relates to a dielectric ceramic composition which can be sintered at a low temperature of 1030° C. or below without containing lead, bismuth or other substance harmful to the environment or to the human body in its composition, which can be co-sintered with metals primarily constituted by Cu and offering excellent electrical conductivity, which has high dielectric constant and also exhibits sufficient dielectric characteristics to satisfy X7R characteristics and X5R characteristics, and which offers high insulation resistance and excellent longevity traits under high-temperature load, etc., even when sintered in a reducing ambience, as well as a laminated ceramic capacitor or other electronic component using such dielectric ceramic composition, and a method of manufacturing such laminated ceramic capacitor.

BACKGROUND ART

Laminated ceramic capacitors produced by simultaneous sintering of dielectric ceramic composition and internal electrodes have been developed in recent years as compact, large-capacity capacitor elements. Traditional dielectric ceramic compositions have high sintering temperatures of 1150° C. to 1400° C. and therefore nickel (Ni) or nickel alloy that withstands high temperatures has been used as the mainstream electrode material for simultaneous sintering with internal electrodes. However, nickel is a rare metal and, as the demand for rare metals is expected to grow, alternative technologies are drawing the attention of late and there is a growing demand to replace nickel with more affordable copper (Cu).

On the other hand, since copper has a melting point of 1085° C., which is lower than the melting point of nickel, use of copper in internal electrodes requires sintering to be implemented at 1030° C. or preferably 1000° C. or below, which gives rise to a need for dielectric material for laminated ceramic capacitors that can demonstrate sufficient characteristics even when sintered at temperatures lower than the temperatures traditionally used. The inventions described below are known as dielectric ceramic compositions meeting the aforementioned requirements, and these inventions describe use of copper in internal electrodes for laminated ceramic capacitors.

For example, Patent Literature 1 describes a dielectric ceramic composition expressed by the composition formula $100 (Ba_{1-x}Ca_x)_m TiO_3 + aMnO + bV_2O_5 + cSiO_2 + dRe_2O_3$ (where Re represents at least one type of metal element selected from Y, La, Sm, Eu, Gd, Tb, Dy, Ho, Er, Tm, and Yb, and a, b, c and d represent mol ratios), wherein such dielectric ceramic composition is characterized by the ranges of $0.030 \leq x \leq 0.20$, $0.990 \leq m \leq 1.030$, $0.010 \leq a \leq 5.0$, $0.050 \leq b \leq 2.5$, $0.20 \leq c \leq 8.0$, and $0.050 \leq d \leq 2.5$. This dielectric ceramic composition is described as follows: "A dielectric ceramic composition can be obtained which has a relative dielectric constant of 3000 or more, but the absolute rate of change in DC bias when 2 V/μm of DC voltage is applied is small at 20% or less, even after the dielectric ceramic layer is made as thin as approx. 1 μm; which has flat temperature characteristics of relative dielectric constant to satisfy the X7R characteristics under the EIA standard (the absolute rate of change in relative dielectric constant due to temperature in a range of −55° C. to 125° C. is within 15% of the reference relative dielectric constant at 25° C.); which has high insulation resistance as represented by a resistivity of $10^{-11}$ Ω·m or more at 25° C.; and which has high high-temperature load reliability as represented by an average time to failure of 100 hours or more when a DC voltage of 10 V/μm in electric field intensity is applied at 150° C." (Paragraph [0018]) and "The internal electrodes are constituted by at least one type of conductive material selected from Ni, Ni alloy, Cu and Cu alloy" (Paragraph [0017]). However, the sintering temperature of the obtained dielectric ceramic composition is still high at 1100° C. or above and in reality the internal electrodes cannot be sintered in a stable manner using copper, and therefore further improvement is needed by lowering the sintering temperature.

In addition, Patent Literature 2 describes a reduction-resistant dielectric ceramic composition whose primary component is expressed by the composition formula $\alpha (Sr_X Ca_Y Ba_{1-X-Y})(Ti_{1-W}M_W)O_3 + (1-\alpha)((Bi_{1-Z}n^*A_Z)_2 O_3 + \beta TiO_2)$ (where M represents at least one type of element selected from Zr and Mg, and A represents at least one type of element selected from Li, K, and Na), wherein the mol ratio α of $(Sr_X Ca_Y Ba_{1-X-Y})(Ti_{1-W}M_W)O_3$ relative to the primary component and mol ratio β of Ti per 1 mol of $(Bi_{1-Z}n^*A_Z)_2 O_3$ are in the ranges of $0.60 < \alpha < 0.85$ and $1.5 < \beta < 4.0$. This reduction-resistant dielectric ceramic composition is described as follows: "Provide a reduction-resistant dielectric ceramic composition which can offer an improved relative dielectric constant without containing lead or other substance harmful to the environment or to the human body in its composition and also a lower rate of change in relative dielectric constant due to temperature, to meet the need for a reduction-resistant dielectric ceramic composition supporting Cu electrodes and other base metal electrodes" (Paragraph [0009]) and "A reduction-resistance dielectric ceramic composition can be obtained which is free of lead in its composition, has a high dielectric constant of 1000 or more, offers excellent temperature characteristics as represented by a rate of change in relative dielectric constant due to temperature of within ±10% at temperatures between −25° C. and +85° C., and exhibits excellent insulation property even after reductive sintering as represented by a CR product of capacitance and insulation resistance of 1000 MΩμF or more" (Paragraph [0013]). However, the reduction-resistant dielectric ceramic composition in Patent Literature 2 uses bismuth, which is a heavy metal, instead of lead, and there is no mention of bismuth-free reduction-resistant dielectric ceramic composition.

Furthermore, Patent Literature 3 describes a dielectric ceramic composition characterized in that it contains a BaO—TiO₂—ReO₃/₂ ceramic composition expressed by $xBaO-yTiO_2-zReO_{3/2}$ (where x, y, and z represent percents by mol in the ranges of $8 \leq x \leq 18$, $52.5 \leq y \leq 65$ and $20 \leq z \leq 40$, and $x+y+z=100$ and Re is a rare earth element) as well as a glass composition containing 10 to 25 percent by weight of $SiO_2$, 10 to 40 percent by weight of $B_2O_3$, 25 to 55 percent by weight of MgO, 0 to 20 percent by weight of ZnO, 0 to 15 percent by weight of $Al_2O_3$, 0.5 to 10 percent by weight of $Li_2O$, and 0 to 10 percent by weight of RO (where R represents at least one type of element selected from Ba, Sr, and Ca), which is described as follows: "Can be sintered at low temperatures of 1000° C. or below and also co-sintered with Ag, Au, Cu or other metal offering excellent electrical conductivity" (Paragraph [0016]). However, the obtained dielectric ceramic composition has a relative dielectric constant of 50 or less and thus is not suitable as a dielectric material for compact, large-capacity laminated ceramic capacitors.

In light of the aforementioned situation, the inventor of the present invention studied with the aim of obtaining a laminated ceramic capacitor which can be sintered at 1080° C. or below in a reducing ambience, which does not contain lead (Pb) or bismuth (Bi) in its dielectric ceramic layers, and which has a dielectric constant of 2000 or more, X7R temperature characteristics of dielectric constant and high-temperature stress longevity traits equivalent to conventional laminated ceramic capacitors with Ni internal electrodes, and discovered conditions for Ba/Ti ratio, composition ratio of rare earths as auxiliary components, and MnO composition ratio, for a dielectric ceramic composition whose primary component is a $BaTiO_3$ compound. Based on the above, the inventor of the present invention proposes a laminated ceramic capacitor having: multiple dielectric ceramic layers; internal electrodes which are formed between the dielectric ceramic layers in a manner opposing each other and led out alternately to different end faces; and external electrodes which are formed on both end faces of the dielectric ceramic layers and each connected electrically to the internal electrodes; wherein such laminated ceramic capacitor is characterized in that: the dielectric ceramic layer is a sintered compact constituted by a primary component expressed by $ABO_3+aRe_2O_3+bMnO$ (where $ABO_3$ is a perovskite dielectric mainly constituted by $BaTiO_3$, $Re_2O_3$ represents at least one type of metal oxide selected from La, Ce, Pr, Nd, Sm, Eu, Gd, Tb, Dy, Ho, Er, Tm, Yb, Lu, and Y, and a and b represent mol numbers relative to 100 mol of $ABO_3$) in the ranges of $1.000 \leq A/B \leq 1.035$, $0.05 \leq a \leq 0.75$, and $0.25 \leq b \leq 2.0$, as well as auxiliary components that include at least one type of element selected from B, Li, and Si for a total of 0.16 to 1.6 parts by mass in equivalent $B_2O_3$, $Li_2O$, and $SiO_2$, respectively; and that the internal electrodes are constituted by Cu or Cu alloy (Patent Literature 4). The inventor of the present invention also proposes that, with a laminated ceramic capacitor whose internal electrodes are constituted by Cu or Cu alloy, X7R or X8R temperature characteristics can be achieved by obtaining its dielectric ceramic as a sintered compact of perovskite dielectric material primarily constituted by $BaTiO_3$, comprised of grains whose average diameter is 400 nm or less in a section view as well as grain boundaries (Patent Literature 5), where examples illustrate mixtures of MnO as a starting material for sintered compact, with $B_2O_3$, $Li_2O$, and $SiO_2$ as additive rare earth oxides and sintering auxiliaries.

BACKGROUND ART LITERATURES

Patent Literatures

Patent Literature 1: Japanese Patent Laid-open No. 2005-194138
Patent Literature 2: Japanese Patent Laid-open No. 2006-213575
Patent Literature 3: Japanese Patent Laid-open No. 2002-97072
Patent Literature 4: Japanese Patent Laid-open No. 2008-42150
Patent Literature 5: Japanese Patent Laid-open No. 2008-72072

SUMMARY OF THE INVENTION

Problems to be Solved by the Invention

After studying further the dielectric ceramic compositions whose primary component is a $BaTiO_3$ compound as described in Patent Literatures 4 and 5 above, the inventor of the present invention discovered that laminated ceramic capacitors using these dielectric ceramic compositions could be improved. In other words, an object of the present invention is to solve the problems of the aforementioned prior arts which are not fully studied, and to provide: with a dielectric ceramic composition whose primary component is a $BaTiO_3$ compound, a dielectric ceramic composition which can be sintered at a low temperature of 1030° C. or below without containing lead, bismuth, or other substance harmful to the environment or to the human body in its composition, which can be co-sintered with metals primarily constituted by Cu and offering excellent electrical conductivity, which has high dielectric constant and also exhibits sufficient dielectric characteristics to satisfy X7R characteristics (the absolute rate of change in relative dielectric constant due to temperature in a range of −55° C. to 125° C. is within 15% of the reference relative dielectric constant at 25° C.) and X5R characteristics (the absolute rate of change in relative dielectric constant due to temperature in a range of −55° C. to 85° C. is within 15% of the reference relative dielectric constant at 25° C.) due to use of Cu in internal electrodes, and which offers high insulation resistance and excellent longevity traits under high-temperature load, etc., even when sintered in a reducing ambience; as well as a laminated ceramic capacitor using such dielectric ceramic composition, and a method of manufacturing such laminated ceramic capacitor.

Means for Solving the Problems

After studying repeatedly and further to achieve the aforementioned object, the inventor of the present invention discovered that, with a dielectric ceramic composition whose primary component is a $BaTiO_3$ compound, the total content of V and Mo, in addition to the content of Re, Mn, B, and Li, would affect the longevity traits of the laminated ceramic capacitor using internal electrodes whose primary component is Cu. It was also discovered that the amount of Cu to diffuse to the dielectric layers from the internal electrodes whose primary component is Cu would also affect the longevity traits of the laminated ceramic capacitor. Moreover, it was found important to keep the content of Si, which is traditionally contained, as well as Si contained as impurity, low from the viewpoint of low-temperature sintering. In addition, although keeping the Si content low would make the dielectric structure unstable and might cause the longevity to drop, under the present invention the content ratio of B is increased from the traditional ratio to properly adjust the Ba/Ti ratio (=m) and content ratio of B (=f) and Li (=g), to achieve low-temperature sintering at 1030° C. or below, and longevity at the same time.

The present invention, which was completed after repeated studies based on the aforementioned findings, is described as follows. [1] A dielectric ceramic composition constituted by a primary component constituted by $BaTiO_3$ and auxiliary components constituted by Re, Mn, V, Mo, Cu, B, Li, Ca, and Sr, wherein such dielectric ceramic composition is characterized in that it is expressed by $BaTiO_3+aRe_2O_3+bMnO+cV_2O_5+dMoO_3+eCuO+fB_2O_3+gLi_2O+xSrO+yCaO$ (where Re represents at least one type of element selected from Eu, Gd, Dy, Ho, Er, Yb, and Y, and a to g, x, and y represent mol numbers relative to 100 mol of the primary component constituted by $BaTiO_3$) and, when the mol ratio of (Ba+Sr+Ca)/Ti contained in the dielectric ceramic composition is given by m, $0.10 \leq a \leq 0.50$, $0.20 \leq b \leq 0.80$, $0 \leq c \leq 0.12$, $0 \leq d \leq 0.07$, $0.04 \leq c+d \leq 0.12$, $0 \leq e \leq 1.00$, $0.50 \leq f \leq 2.00$, $0.6 \leq (100(m-1)+2g)/2f \leq 1.3$, $0.5 \leq 100(m-1)/2g \leq 5.1$, $0 \leq x \leq 1.5$, and $0 \leq y \leq 1.5$. [2] A dielectric ceramic composition according to [1] above, characterized in that Si contained as impurity accounts for 1.0 mol or less in equivalent $SiO_2$ relative to 100 mol of the primary component constituted by $BaTiO_3$. [3] A dielectric ceramic composition according to [1] or [2] above, characterized in that it is expressed by $(Ba_{1-v-w}Sr_vCa_w)TiO_3+aRe_2O_3+bMnO+cV_2O_5+dMoO_3+eCuO+fB_2O_3+gLi_2O+xSrO+yCaO$, where $0 \le x+v \times 100 \le 1.5$, and $0 \le y+w \times 100 \le 1.5$. [4] A dielectric ceramic composition according to any one of [1] to [3] above, characterized in that it can be made denser at a sintering temperature of 1030° C. or below. [5] A laminated ceramic capacitor having multiple dielectric ceramic layers as well as internal electrodes formed between the dielectric ceramic layers in a manner opposing each other, wherein such laminated ceramic capacitor is characterized in that the dielectric ceramic layer is a sintered compact constituted by a dielectric ceramic composition according to any one of [1] to [4] above and that the internal electrode is constituted by Cu or Cu alloy. [6] A laminated ceramic capacitor according to [5] above, characterized in that such laminated ceramic capacitor has: multiple dielectric ceramic layers; internal electrodes which are formed between the dielectric ceramic layers in a manner opposing each other and led out alternately to different end faces; and external electrodes which are formed on both end faces of the dielectric ceramic layers and each connected electrically to the internal electrodes. [7] A method of manufacturing laminated ceramic capacitor according to [5] or [6] above, characterized in that it comprises: a step to prepare a ceramic material which contains a primary component material constituted by a $BaTiO_3$ compound as well as auxiliary component materials including at least Re (here, Re represents at least one type of element selected from Eu, Gd, Dy, Ho, Er, Yb and Y), Mn, B, and Li, and at least one of V and Mo, or further Cu, Ba, Sr, and Ca, in the form of oxide, glass, or other compound; a sheet-forming step where the ceramic material is used to form ceramic green sheets; a printing step where internal electrode patterns whose primary component is Cu are printed on the ceramic green sheets; a lamination step where the ceramic green sheets completing the printing step are layered to form a laminate; a cutting step where the laminate is cut to each internal electrode pattern to obtain a chip-shaped laminate; a sintering step where the chip-shaped laminate obtained by the cutting step is sintered in a reducing ambience at a temperature of 1030° C. or below to obtain a sintered compact; and an external electrode-forming step where a conductive external electrode paste is applied on both ends of the sintered compact in a manner electrically connecting the internal electrodes, followed by baking [8] A method of manufacturing laminated ceramic capacitor according to [5] or [6] above, characterized in that it comprises: a step to prepare a ceramic material which contains a primary component material constituted by a $BaTiO_3$ compound as well as auxiliary component materials including at least Re (here, Re represents at least one type of element selected from Eu, Gd, Dy, Ho, Er, Yb and Y), Mn, B, and Li, and at least one of V and Mo, or further Cu, Ba, Sr, and Ca, in the form of oxide, glass or other compound; a sheet-forming step where the ceramic material is used to form ceramic green sheets; a printing step where internal electrode patterns whose primary component is Cu are printed on the ceramic green sheets; a lamination step where the ceramic green sheets completing the printing step are layered to form a laminate; a cutting step where the laminate is cut to each internal electrode pattern to obtain a chip-shaped laminate; an external electrode-forming step where a conductive external electrode paste is applied on both ends of the chip-shaped laminate obtained by the cutting step in a manner electrically connecting the internal electrodes; and a sintering step where the chip-shaped laminate obtained by the external electrode-forming step is sintered in a reducing ambience at a temperature of 1030° C. or below.

Effects of the Invention

According to the present invention, a dielectric ceramic composition and laminated ceramic capacitor can be obtained which can be sintered at a low temperature of 1030° C. or below without containing lead, bismuth, or other substance harmful to the environment or human body in their composition, which can be co-sintered with metals primarily constituted by Cu and offering excellent electrical conductivity, which have high dielectric constant and also exhibit sufficient dielectric characteristics to satisfy X7R characteristics (or X5R characteristics) due to use of Cu in internal electrodes, and which offer high insulation resistance and excellent longevity traits under high-temperature load, etc., even when sintered in a reducing ambience.

BRIEF DESCRIPTION OF THE DRAWINGS

FIG. 1 Schematic drawing illustrating an embodiment of a laminated ceramic capacitor conforming to the present invention

MODE FOR CARRYING OUT THE INVENTION

FIG. 1 is a schematic drawing illustrating an embodiment of a laminated ceramic capacitor that uses a dielectric ceramic composition conforming to the present invention in its dielectric layers. As shown in FIG. 1, a laminated ceramic capacitor 1 conforming to the present invention is constituted in such a way that dielectric layers 2 constituted by a ceramic sintered compact are alternately layered with internal electrodes 3 whose primary component is Cu, and a pair of external electrodes 4 are formed on both ends of the laminated ceramic capacitor 1 in a manner each connected electrically to the internal electrodes 3 which are arranged alternately between the dielectric layers 2. The shape of the laminated ceramic capacitor 1 is not limited in any way, but it is normally a rectangular solid. Its dimensions are not limited in any way, either, and any dimensions can be used as appropriate for the purpose.

The dielectric ceramic composition used for the dielectric layers 2 conforming to the present invention is constituted by a primary component constituted by $BaTiO_3$ as well as auxiliary components constituted by Re, Mn, V, Mo, Cu, B, and Li. Here, the dielectric ceramic composition of the dielectric layers 2 conforming to the present invention is expressed by $BaTiO_3+aRe_2O_3+bMnO+cV_2O_5+dMoO_3+eCuO+fB_2O_3+gLi_2O+xSrO+yCaO$ (where Re represents at least one type of element selected from Eu, Gd, Dy, Ho, Er, Yb, and Y, and a to g, x, and y represent mol numbers relative to 100 mol of the primary component constituted by $BaTiO_3$) and, when the mol ratio of (Ba+Sr+Ca)/Ti contained in the dielectric ceramic composition is given by m, $0.10 \le a \le 0.50$ or more preferably $0.20 \le a \le 0.35$, $0.20 \le b \le 0.80$ or more preferably $0.20 \le b \le 0.60$, $0 \le c \le 0.12$ or more preferably $0 \le c \le 0.10$, $0 \le d \le 0.07$, $0.04 \le c+d \le 0.12$, $0 \le e \le 1.00$, $0.50 \le f \le 2.00$ or more preferably $0.65 \le f \le 1.50$, $0.6 \le (100(m-1)+2g)/2f \le 1.3$, $0.5 \le 100(m-1)/2g \le 5.1$, $0 \le x \le 1.5$, and $0 \le y \le 1.5$.

Here, a small amount of $Re_2O_3$, or a, especially less than 0.10, causes the longevity to drop significantly, while an excessive amount causes the sintering property to drop and even makes sintering at 1030° C. or below difficult when the amount is greater than 0.50. Accordingly, the range is preferably $0.10 \le a \le 0.50$. A more preferable range is $0.20 \le a \le 0.35$ where high longevity traits and densification at 1000° C. or below can be achieved.

On the other hand, a small amount of MnO, or b, causes the longevity to drop, while an excessive amount causes the sintering property to drop and even makes sintering at 1030° C. or below difficult when the amount is greater than 0.80. Accordingly, the range is preferably $0.20 \le b \le 0.80$. A more preferable range is $0.20 \le b \le 0.60$ where high longevity traits and densification at 1000° C. or below can be achieved.

Since the longevity traits drop when either V or Mo is not included as an auxiliary component, $c+d \ge 0.04$ is desirable, but the longevity traits also drop when the total content of V and Mo is excessive. Accordingly, the range is preferably $0.04 \le c+d \le 0.12$. Furthermore, the longevity traits drop when more than 0.12 of V and more than 0.07 of Mo are added, which suggests that $0 \le c \le 0.12$ and $0 \le d \le 0.07$ are preferable. In particular, better longevity traits can be achieved in the range of $0 \le c \le 0.10$.

It is known that use of Cu in the internal electrodes causes Cu to diffuse from the internal electrodes to the dielectric layers. Accordingly, it is assumed that Cu is already contained in the dielectric layers, without adding Cu separately, and that this content of Cu improves the longevity traits. Here, the diffusion of Cu from the internal electrodes to the dielectric layers is assumed to reach equilibrium and stabilize when CuO is not added. However, the longevity drops when Cu is added externally to the point of excessive abundance of Cu. Accordingly, $0 \le e \le 1.00$ is preferable. It should be noted that Cu can be contained in the dielectric layers by causing Cu to diffuse from the Cu internal electrodes to the dielectric layers in the sintering step, instead of adding Cu as a material in the material step.

A content of $B_2O_3$, or f, of less than 0.50 causes the sintering property to drop and makes sintering at 1030° C. or below difficult, while a content larger than 2.00 causes the longevity to drop, and accordingly the range is preferably $0.50 \le f \le 2.00$. To achieve even lower sintering temperatures, a more preferable range is $0.65 \le f \le 1.5$ where high longevity traits and densification at 1000° C. or below can be achieved.

Also, as for the amount of $Li_2O$, or g, the life drops when $(100(m-1)+2g)/2f$ is less than 0.6, while the sintering property drops and densification at 1030° C. or below becomes difficult when it is greater than 1.3. Accordingly, the range is preferably $0.6 \le (100(m-1)+2g)/2f \le 1.3$. Also, preferably, $m>1$ because the longevity traits drop when $m \le 1$. Note, however, that the value of m is not uniquely determined when the $BaTiO_3$ compound is synthesized, and similar effects can be achieved by adding oxides and carbides of Ba, Sr, and Ca in the material step to adjust the value of m. The longevity traits drop when $100(m-1)/2g$ is less than 0.50, while the sintering property drops and sintering at 1030° C. or below becomes difficult when it is greater than 5.1. Accordingly, the range is preferably $0.50 \le 100(m-1)/2g \le 5.1$. Also, Sr and Ca can be used as adjustment elements in the same manner as Ba. Under the present invention, adjustment of m has been confirmed effective in the ranges of $0 \le x \le 1.5$ and $0 \le y \le 1.5$. Furthermore, similar effects can be achieved by adding $(Ba_{1-x-y}Sr_xCa_w)TiO_3$ whose primary components are Sr and Ca, because added Sr and Ca dissolve in the primary component of $BaTiO_3$ compound in the sintering step.

Desirably Si is not contained for lowering the sintering temperature, but it is highly likely that Si is contained during the manufacturing process, such as in the dispersion step. Accordingly, $SiO_2$ was added intentionally under the present invention to check the stability of the system relative to the Si content, and it was found that the characteristics were not significantly affected as long as the Si content was 1.0 percent by mol or less in equivalent $SiO_2$. On the other hand, however, the sintering property drops significantly when Si is contained by more than 1.0 percent by mol, and therefore the content of $SiO_2$ impurity must be kept to 1.0 percent by mol or less.

As mentioned above, the present invention proposes a dielectric ceramic composition and laminated ceramic capacitor which, by the design of the dielectric ceramic composition used in their dielectric layers 2, can be sintered at a low temperature of 1030° C. or below, or preferably 1000° C. or below, without containing lead, bismuth, or other substance harmful to the environment or to the human body in their composition, which can be co-sintered with metals primarily constituted by Cu and offering excellent electrical conductivity, which have high dielectric constant and also exhibit sufficient dielectric characteristics to satisfy X7R characteristics or X5R characteristics, and which offer high insulation resistance and excellent longevity traits under high-temperature load, etc., even when sintered in a neutral or reducing ambience. If Cu is not used in the internal electrodes, not only the longevity extension effect of Cu diffusion from the Cu internal electrodes in the sintering step becomes unachievable, but also when Ni is used in the internal electrodes, for example, Cu added in the material step is absorbed by the Ni electrodes in the sintering step, and therefore the internal electrodes must use Cu or Cu alloy. It should be noted that any other element can be contained as long as the object of the present invention is not disturbed. For example, Zr, etc., may enter as impurities in a dispersion step.

Next, a method of manufacturing a laminated ceramic capacitor under the present invention is described. A method of manufacturing a laminated ceramic capacitor conforming to the present invention comprises: (1) a step to prepare a ceramic material which contains a primary component material constituted by a $BaTiO_3$ compound as well as auxiliary component materials including at least Re (here, Re represents at least one type of element selected from Eu, Gd, Dy, Ho, Er, Yb, and Y), Mn, B, Si, and Li, and at least one of V and Mo, or further Cu, Ba, Sr, and Ca, in the form of oxide, glass, or other compound; (2) a sheet-forming step where the ceramic material is used to form ceramic green sheets; and (3) a printing step where internal electrode patterns whose primary component is Cu are printed on the ceramic green sheets; (4) a lamination step where the ceramic green sheets completing the printing step are layered to form a laminate; (5) a cutting step where the laminate is cut to each internal electrode pattern to obtain a chip-shaped laminate; (6) a sintering step where the chip-shaped laminate obtained by the cutting step is sintered in a reducing ambience at a temperature of 1030° C. or below, or preferably 1000° C. or below, to obtain a sintered compact; and (7) an external electrode-forming step where a conductive external electrode paste is applied on both ends of the sintered compact in a manner electrically connecting the internal electrodes, followed by baking. Also in the external electrode-forming step (7), it is possible to apply a conductive external electrode paste on both ends of the chip-shaped laminate obtained by the cutting step in a manner electrically connecting the internal electrodes and then to sinter the paste in a reducing ambience at a temperature of 1030° C. or below, or preferably 1000° C. or below, thereby effectively implementing the external electrode-forming step and sintering step simultaneously.

EXAMPLES

The present invention is explained in greater detail below using examples, but it should be noted that the present invention is not limited in any way to these examples. In implementing the present invention, due attention was paid not to let Si contaminants enter in the weighing, mixing, crushing, forming, and sintering steps.

Example 1

As starting materials, $BaTiO_3$, $Re_2O_3$, $MnO_2$, $B_2O_3$, and $SiO_2$, as well as $Li_2CO_3$, $V_2O_5$, $MoO_3$, CuO, $BaCO_3$, $SrCO_3$, and $CaCO_3$, were prepared. In doing so, the Ba/Ti ratio (=n) of the starting material $BaTiO_3$ was analyzed by XRF beforehand in order to adjust the (Ba+Sr+Ca)/Ti ratio in the dielectric ceramic composition. Thereafter, the materials were weighed to achieve each specified composition in Tables 1 (1) and (2). Here, when the amounts of $BaCO_3$, $SrCO_3$, and $CaCO_3$ added per 100 mol of $BaTiO_3$ are given by i, j, and k (mol), respectively, m can be expressed as m=n+i/100+j/100+k/100.

TABLE 1

| Sample No. | n | Re | a Re2O3 | b MnO | c V2O5 | d MoO3 | e CuO | f B2O3 | g Li2O | h SiO2 | i BaO | j SrO | k CaO | Internal electrode | m | c + d | (100(m − 1) + 2g)/2f | 100(m − 1)/2g |
|---|---|---|---|---|---|---|---|---|---|---|---|---|---|---|---|---|---|---|
| 1 | 0.992 | Dy | 0.35 | 0.40 | 0.05 | 0.07 | 0.00 | 0.65 | 0.12 | 0.00 | 1.12 | 0.49 | | Cu | 1.008 | 0.12 | 0.82 | 3.31 |
| 2 | 0.992 | Dy | 0.35 | 0.20 | 0.05 | 0.03 | 0.00 | 1.30 | 0.50 | 0.00 | 1.00 | 1.49 | | Cu | 1.017 | 0.08 | 1.03 | 1.69 |
| 3 | 0.992 | Dy | 0.35 | 0.40 | 0.01 | 0.07 | 0.00 | 1.30 | 0.52 | 0.00 | 0.74 | 0.83 | | Cu | 1.008 | 0.08 | 0.70 | 0.74 |
| 4 | 0.992 | Dy | 0.25 | 0.40 | 0.01 | 0.03 | 0.00 | 0.65 | 0.36 | 0.00 | 0.57 | 0.77 | | Cu | 1.005 | 0.04 | 0.97 | 0.76 |
| 5 | 0.994 | Ho | 0.25 | 0.60 | 0.01 | 0.07 | 0.00 | 0.98 | 0.32 | 0.00 | 0.67 | 0.96 | | Cu | 1.010 | 0.08 | 0.86 | 1.59 |
| 6 | 0.994 | Ho | 0.35 | 0.20 | 0.01 | 0.03 | 0.00 | 0.98 | 0.19 | 0.00 | 1.26 | 0.65 | | Cu | 1.013 | 0.04 | 0.86 | 3.54 |
| 7 | 0.994 | Ho | 0.25 | 0.60 | 0.05 | 0.03 | 0.00 | 0.65 | 0.10 | 0.00 | 0.50 | 0.67 | | Cu | 1.006 | 0.08 | 0.60 | 2.72 |
| 8 | 0.994 | Ho | 0.35 | 0.20 | 0.05 | 0.03 | 0.00 | 1.30 | 0.50 | 0.00 | 0.80 | 1.49 | | Cu | 1.017 | 0.08 | 1.03 | 1.69 |
| 9 | 0.999 | Dy | 0.25 | 0.20 | 0.01 | 0.05 | 0.00 | 1.30 | 0.21 | 0.00 | 0.76 | 0.83 | | Cu | 1.017 | 0.06 | 0.80 | 4.00 |
| 10 | 0.999 | Dy | 0.35 | 0.60 | 0.05 | 0.05 | 0.00 | 0.98 | 0.39 | 0.00 | 0.71 | | | Cu | 1.008 | 0.10 | 0.80 | 1.00 |
| 11 | 0.999 | Dy | 0.15 | 0.60 | 0.05 | 0.03 | 0.00 | 1.30 | 0.62 | 0.00 | 0.55 | 0.62 | | Cu | 1.012 | 0.08 | 0.95 | 1.00 |
| 12 | 0.999 | Dy | 0.10 | 0.40 | 0.05 | 0.05 | 0.00 | 0.98 | 0.21 | 0.00 | 0.27 | 1.37 | | Cu | 1.017 | 0.10 | 1.10 | 4.00 |
| 13 | 0.999 | Ho | 0.25 | 0.40 | 0.10 | 0.00 | 0.00 | 1.30 | 0.43 | 0.00 | 1.37 | 0.16 | | Cu | 1.014 | 0.10 | 0.88 | 1.66 |
| 14 | 0.999 | Ho | 0.35 | 0.40 | 0.00 | 0.07 | 0.00 | 1.50 | 0.52 | 0.00 | 0.54 | 0.83 | | Cu | 1.013 | 0.07 | 0.77 | 1.22 |
| 15 | 0.999 | Ho | 0.35 | 0.20 | 0.05 | 0.03 | 0.00 | 2.00 | 0.50 | 0.00 | 1.00 | 1.49 | | Cu | 1.024 | 0.08 | 0.85 | 2.38 |
| 16 | 0.999 | Ho | 0.35 | 0.40 | 0.12 | 0.00 | 0.00 | 0.65 | 0.12 | 0.00 | 0.42 | 0.49 | | Cu | 1.008 | 0.12 | 0.82 | 3.31 |
| 17 | 1.001 | Gd | 0.25 | 0.60 | 0.01 | 0.07 | 0.00 | 0.98 | 0.32 | 0.00 | 0.17 | | 0.96 | Cu | 1.012 | 0.08 | 0.95 | 1.86 |
| 18 | 1.001 | Gd | 0.35 | 0.20 | 0.01 | 0.03 | 0.00 | 0.98 | 0.19 | 0.00 | 1.26 | | 0.15 | Cu | 1.015 | 0.04 | 0.95 | 4.00 |
| 19 | 1.001 | Gd | 0.25 | 0.20 | 0.01 | 0.05 | 0.00 | 1.30 | 0.15 | 0.00 | 0.76 | 0.83 | | | 1.017 | 0.06 | 0.76 | 5.55 |
| 20 | 1.001 | Gd | 0.25 | 0.80 | 0.01 | 0.07 | 0.00 | 0.98 | 0.32 | 0.00 | 0.17 | 0.96 | | Cu | 1.012 | 0.08 | 0.95 | 1.86 |
| 21 | 1.001 | Gd | 0.60 | 0.60 | 0.01 | 0.07 | 0.00 | 0.98 | 0.32 | 0.00 | 0.17 | 0.96 | | | 1.012 | 0.08 | 0.95 | 1.86 |
| 22 | 1.001 | Gd | 0.25 | 0.40 | 0.05 | 0.05 | 0.00 | 1.30 | 0.43 | 0.00 | 1.37 | 0.16 | | Cu | 1.016 | 0.10 | 0.95 | 1.86 |
| 23 | 1.001 | Gd | 0.25 | 0.40 | 0.05 | 0.05 | 0.00 | 1.30 | 0.43 | 0.00 | 1.37 | 0.16 | | Cu | 1.016 | 0.10 | 0.95 | 1.86 |
| 24 | 1.001 | Gd | 0.25 | 0.40 | 0.10 | 0.02 | 0.00 | 1.30 | 0.43 | 0.00 | 1.37 | 0.16 | | Cu | 1.016 | 0.12 | 0.95 | 1.86 |
| 25 | 1.001 | Gd | 0.15 | 0.60 | 0.01 | 0.07 | 0.00 | 2.30 | 0.29 | 0.00 | 1.99 | 0.23 | | Cu | 1.023 | 0.08 | 0.62 | 4.00 |
| 26 | 1.001 | Gd | 0.15 | 0.60 | 0.00 | 0.09 | 0.00 | 1.30 | 0.29 | 0.00 | 1.99 | 0.23 | | Cu | 1.023 | 0.09 | 1.10 | 4.00 |
| 27 | 1.001 | Gd | 0.15 | 0.40 | 0.01 | 0.03 | 0.00 | 1.50 | 0.27 | 0.00 | 0.44 | 0.51 | | Cu | 1.010 | 0.04 | 0.52 | 1.86 |
| 28 | 1.001 | Gd | 0.15 | 0.20 | 0.01 | 0.01 | 0.00 | 0.65 | 0.31 | 0.00 | 0.05 | 0.49 | | Cu | 1.006 | 0.02 | 0.95 | 1.00 |
| 29 | 1.001 | Gd | 0.35 | 0.40 | 0.05 | 0.07 | 0.00 | 0.65 | 0.12 | 0.00 | 0.42 | 0.49 | | Cu | 1.010 | 0.12 | 0.95 | 4.00 |
| 30 | 1.001 | Gd | 0.25 | 0.60 | 0.05 | 0.03 | 0.00 | 0.65 | 0.10 | 0.00 | 0.10 | | 0.67 | Cu | 1.008 | 0.08 | 0.80 | 4.00 |
| 31 | 1.001 | Gd | 0.35 | 0.20 | 0.05 | 0.03 | 0.00 | 1.30 | 0.50 | 0.00 | 0.30 | | 1.49 | Cu | 1.019 | 0.08 | 1.10 | 1.86 |
| 32 | 1.001 | Gd | 0.35 | 0.20 | 0.15 | 0.00 | 0.00 | 0.98 | 0.19 | 0.00 | 1.26 | 0.15 | | Cu | 1.015 | 0.15 | 0.95 | 4.00 |
| 33 | 1.001 | Gd | 0.35 | 1.00 | 0.01 | 0.05 | 0.00 | 0.65 | 0.25 | 0.00 | 0.39 | 0.46 | | | 1.009 | 0.06 | 1.10 | 1.86 |
| 34 | 1.001 | Gd | 0.25 | 0.10 | 0.05 | 0.07 | 0.00 | 0.98 | 0.54 | 0.00 | 0.47 | 0.54 | | Cu | 1.011 | 0.12 | 1.10 | 1.00 |
| 35 | 1.001 | Gd | 0.25 | 0.60 | 0.05 | 0.03 | 0.00 | 0.50 | 0.10 | 0.00 | 0.10 | 0.47 | | Cu | 1.006 | 0.08 | 0.84 | 3.04 |
| 36 | 1.001 | Gd | 0.25 | 0.60 | 0.05 | 0.03 | 0.00 | 0.41 | 0.10 | 0.00 | 0.10 | 0.67 | | | 1.008 | 0.08 | 1.27 | 4.00 |
| 37 | 1.001 | Gd | 0.05 | 0.60 | 0.05 | 0.03 | 0.00 | 1.30 | 0.62 | 0.00 | 0.55 | 0.62 | | Cu | 1.012 | 0.08 | 0.95 | 1.00 |
| 38 | 1.001 | Gd | 0.15 | 0.40 | 0.05 | 0.05 | 0.00 | 0.70 | 0.21 | 0.00 | 0.27 | 1.37 | | Cu | 1.017 | 0.10 | 1.53 | 4.00 |
| 39 | 1.001 | Gd | 0.15 | 0.20 | 0.08 | 0.07 | 0.00 | 0.65 | 0.18 | 0.00 | 0.61 | | | Cu | 1.007 | 0.15 | 0.80 | 1.86 |
| 40 | 1.001 | Gd | 0.35 | 0.40 | 0.01 | 0.07 | 0.00 | 1.30 | 0.52 | 0.00 | 0.14 | 0.83 | | Cu | 1.010 | 0.08 | 0.80 | 1.00 |
| 41 | 1.001 | Gd | 0.35 | 0.60 | 0.05 | 0.05 | 0.00 | 0.98 | 0.85 | 0.00 | 0.63 | 0.08 | | Cu | 1.008 | 0.10 | 1.27 | 0.46 |
| 42 | 1.001 | Gd | 0.20 | 0.40 | 0.01 | 0.03 | 0.00 | 0.65 | 0.36 | 0.00 | 0.65 | | | Cu | 1.007 | 0.04 | 1.10 | 1.00 |
| 43 | 1.001 | Gd | 0.50 | 0.40 | 0.05 | 0.07 | 0.00 | 0.65 | 0.12 | 0.00 | 0.42 | 0.49 | | Cu | 1.010 | 0.12 | 0.95 | 4.00 |
| 44 | 1.003 | Er | 0.35 | 0.40 | 0.01 | 0.07 | 0.00 | 1.30 | 0.52 | 0.00 | 0.14 | 0.33 | | Cu | 1.008 | 0.08 | 0.70 | 0.74 |
| 45 | 1.003 | Eu | 0.25 | 0.40 | 0.01 | 0.03 | 0.00 | 0.65 | 0.36 | 0.00 | 0.65 | | | Cu | 1.009 | 0.04 | 1.28 | 1.32 |
| 46 | 1.003 | Y | 0.25 | 0.40 | 0.01 | 0.03 | 0.00 | 0.65 | 0.36 | 0.00 | 0.25 | | | Cu | 1.005 | 0.04 | 0.97 | 0.76 |
| 47 | 1.003 | Yb | 0.35 | 0.40 | 0.01 | 0.07 | 0.00 | 1.30 | 0.52 | 0.00 | 0.14 | 0.13 | | Cu | 1.006 | 0.08 | 0.62 | 0.55 |
| 48 | 0.992 | Dy | 0.25 | 0.40 | 0.05 | 0.05 | 0.00 | 1.30 | 0.43 | 0.00 | 1.37 | 0.86 | | Ni | 1.014 | 0.10 | 0.88 | 1.66 |
| 49 | 0.994 | Ho | 0.25 | 0.60 | 0.01 | 0.07 | 0.00 | 0.98 | 0.32 | 0.00 | 0.67 | 0.96 | | Ni | 1.010 | 0.08 | 0.86 | 1.59 |
| 50 | 0.994 | Ho | 0.35 | 0.20 | 0.01 | 0.03 | 0.00 | 0.98 | 0.19 | 0.00 | 1.26 | 0.65 | | Ni | 1.013 | 0.04 | 0.86 | 3.54 |
| 51 | 0.999 | Dy | 0.25 | 0.20 | 0.01 | 0.05 | 0.00 | 1.30 | 0.21 | 0.00 | 0.76 | 0.83 | | Ni | 1.017 | 0.06 | 0.80 | 4.00 |
| 52 | 0.999 | Dy | 0.35 | 0.60 | 0.05 | 0.05 | 0.00 | 0.98 | 0.39 | 0.00 | 0.71 | | | Ni | 1.008 | 0.10 | 0.80 | 1.00 |
| 53 | 1.001 | Gd | 0.25 | 0.60 | 0.01 | 0.07 | 0.00 | 0.98 | 0.32 | 0.00 | 0.17 | | 0.96 | Ni | 1.012 | 0.08 | 0.95 | 1.86 |
| 54 | 1.001 | Gd | 0.35 | 0.20 | 0.01 | 0.03 | 0.00 | 0.98 | 0.19 | 0.00 | 1.26 | | 0.15 | Ni | 1.015 | 0.04 | 0.95 | 4.00 |
| 55 | 0.992 | Dy | 0.35 | 0.40 | 0.05 | 0.07 | 0.10 | 0.65 | 0.12 | 0.00 | 1.12 | 0.49 | | Cu | 1.008 | 0.12 | 0.82 | 3.31 |
| 56 | 0.992 | Dy | 0.25 | 0.40 | 0.01 | 0.03 | 0.50 | 0.65 | 0.36 | 0.00 | 0.57 | 0.77 | | Cu | 1.005 | 0.04 | 0.97 | 0.76 |
| 57 | 0.999 | Ho | 0.35 | 0.40 | 0.00 | 0.07 | 0.20 | 1.50 | 0.52 | 0.00 | 0.54 | 0.83 | | Cu | 1.013 | 0.07 | 0.77 | 1.22 |
| 58 | 1.001 | Gd | 0.25 | 0.60 | 0.01 | 0.07 | 2.00 | 0.98 | 0.32 | 0.00 | 0.17 | | 0.96 | Cu | 1.012 | 0.08 | 0.95 | 1.86 |
| 59 | 1.001 | Gd | 0.35 | 0.20 | 0.05 | 0.03 | 0.80 | 1.30 | 0.50 | 0.00 | 0.30 | | 1.49 | Cu | 1.019 | 0.08 | 1.10 | 1.86 |
| 60 | 1.001 | Gd | 0.20 | 0.40 | 0.01 | 0.03 | 1.00 | 0.65 | 0.36 | 0.00 | 0.65 | | | Cu | 1.007 | 0.04 | 1.10 | 1.00 |
| 61 | 1.003 | Gd | 0.35 | 0.40 | 0.05 | 0.07 | 0.30 | 0.65 | 0.12 | 0.00 | 0.42 | 0.49 | | Cu | 1.012 | 0.12 | 1.13 | 4.93 |
| 62 | 0.994 | Ho | 0.25 | 0.60 | 0.01 | 0.07 | 0.00 | 0.98 | 0.32 | 0.50 | 0.67 | 0.96 | | Cu | 1.010 | 0.08 | 0.86 | 1.59 |
| 63 | 0.994 | Ho | 0.35 | 0.20 | 0.01 | 0.03 | 0.00 | 0.98 | 0.19 | 0.10 | 1.26 | 0.65 | | Cu | 1.013 | 0.04 | 0.86 | 3.54 |

TABLE 1-continued

| Sample No. | n | Re | a Re2O3 | b MnO | e V2O5 | d MoO3 | e CuO | f B2O3 | g Li2O | h SiO2 | i BaO | j SrO | k CaO | Internal electrode | m | c + d | (100(m − 1) + 2g)/2f | 100(m − 1)/2g |
|---|---|---|---|---|---|---|---|---|---|---|---|---|---|---|---|---|---|---|
| 64 | 0.999 | Dy | 0.25 | 0.20 | 0.01 | 0.05 | 0.00 | 1.30 | 0.21 | 0.80 | 0.76 | 0.83 |  | Cu | 1.017 | 0.06 | 0.80 | 4.00 |
| 65 | 0.999 | Dy | 0.35 | 0.60 | 0.05 | 0.05 | 0.00 | 0.98 | 0.39 | 0.60 | 0.71 |  |  | Cu | 1.008 | 0.10 | 0.80 | 1.00 |
| 66 | 1.001 | Gd | 0.35 | 0.20 | 0.01 | 0.03 | 0.00 | 0.98 | 0.19 | 2.00 | 1.26 | 0.15 |  |  | 1.015 | 0.04 | 0.95 | 4.00 |
| 67 | 1.001 | Gd | 0.25 | 0.40 | 0.05 | 0.05 | 0.00 | 1.30 | 0.43 | 0.30 | 1.37 |  | 0.16 | Cu | 1.016 | 0.10 | 0.95 | 1.86 |
| 68 | 1.001 | Gd | 0.25 | 0.60 | 0.06 | 0.03 | 0.00 | 0.65 | 0.10 | 0.20 | 0.10 |  | 0.67 | Cu | 1.008 | 0.08 | 0.80 | 4.00 |
| 69 | 1.001 | Gd | 0.35 | 0.40 | 0.01 | 0.07 | 0.00 | 1.30 | 0.52 | 1.00 | 0.14 | 0.83 |  | Cu | 1.010 | 0.08 | 0.80 | 1.00 |
| 70 | 1.001 | Gd | 0.20 | 0.40 | 0.01 | 0.03 | 0.00 | 0.65 | 0.36 | 0.20 | 0.65 |  |  | Cu | 1.007 | 0.04 | 1.10 | 1.00 |

Next, these weighed materials were put in a pot mill together with ceramic balls and wet-mixed/crushed, and then were put in a stainless vat and dried with a hot-air drier to obtain a dielectric powder. Ceramic materials for these primary component and auxiliary components only need to be oxidized when heat-treated and they need not be a carbide or oxide.

Next, a preliminary test was conducted to check sintering property, where the obtained dielectric powder was pulverized using polyvinyl alcohol, etc., and then put in the specified die and uniaxially molded, after which the molding was kept for 2 hours at 1030° C. in an ambience of $N_2$: 98%-$H_2$: 2% gas containing water vapor, to obtain a ceramic sintered compact. The obtained ceramic sintered compact was measured for open pore ratio according to JIS-R1634, and its sintering property was indicated by "○" when the open pore ratio was 1% or less, or "X" when the open pore ratio exceeded 1%, as shown in Tables 2 (1), (2) below. Additionally, the sintering temperature was changed to 1000° C., and the result was studied in the same manner, where an open pore ratio of 1% or less at the sintering temperature of 1000° C. was indicated by "⊚."

Next, dielectric powders that became denser at 1030° C. or below (sintering property of "○" or "⊚") were selected from the dielectric powders obtained above, and each such powder was mixed with PVB binder or acrylic binder, plasticizer, and organic solvent as medium, as deemed appropriate, to prepare a ceramic slurry, after which a reverse roll coater, etc., was used to apply this ceramic slurry on polyester films to a thickness of 7 μm to prepare green sheets. Thereafter, the green sheets were cut to the specified dimensions to obtain rectangular ceramic green sheets. Screen printing or other method was used to print the obtained rectangular ceramic green sheets with an internal electrode paste whose primary component is Cu, to form conductive patterns. For the internal electrode paste, a paste prepared by kneading and mixing together fine metal particles whose primary component is Cu and an organic vehicle, etc., constituted by organic binder dissolved in solvent, was used. For comparison, samples printed with a Ni internal electrode paste were also prepared.

Next, multiple ceramic green sheets on which conductive patterns were formed were layered in the specified direction. In doing so, the ceramic green sheets were arranged in such a way that the printed sides of the adjacent pair of ceramic green sheets on top and bottom would be displaced by approx. one half the internal electrode patterns in the lengthwise direction of the patterns. Furthermore, ceramic green sheets for protective layers having no internal electrode pattern printed on them were layered and pressure-bonded on both the top face and bottom face of the laminate. Thereafter, the laminate was cut to the specified shape to prepare a ceramic laminate. This was followed by a binder removal process implemented at 300 to 600° C. in an ambience sufficiently inert to not oxidize Cu, after which the temperature was raised at a rate of 300° C. per hour to the specified sintering temperature (960 to 1020° C.) in an ambience of $N_2$: 98%-$H_2$: 2% gas containing water vapor. Once the sintering temperature was reached, it was held for 2 hours and then the temperature was lowered at a rate of 300° C. per hour and at approx. 700° C., the ambience was replaced with nitrogen and the nitrogen ambience was held for 2 hours, after which the temperature was lowered to room temperature to obtain a laminated ceramic sintered compact with internal electrodes 3 embedded in it.

Next, this laminated ceramic sintered compact was barreled to expose the internal electrodes 3 from the end faces of the sintered compact, after which an external electrode paste was applied on both ends and dried, and then baked at the specified temperature (700 to 900° C.) in an ambience of $N_2$ gas, to form external electrodes 4. For the external electrode paste, a paste prepared by kneading and mixing together fine metal particles whose primary component is Cu, organic vehicle and small amount of frit etc., was used. However, the external electrode paste is not limited to the foregoing and Ni, Ag, etc., can also be used as external electrodes.

The obtained laminated ceramic capacitor was measured for capacitance C and tan δ using an automatic bridge-measuring instrument under the conditions of 1 kHz in frequency, 1 ACVrms in effective voltage and 25° C. in temperature, and the capacitance C and sample dimensions were used to calculate the relative dielectric constant. As for temperature dependence of capacitance, the capacity was measured in a temperature range of −55° C. to 150° C. and samples satisfying X7R or X5R under the EIA standard were deemed "Good," while others were given "X." As for insulation resistance (IR), an insulation resistance tester was used to apply 50 V of DC voltage at 25° C. for 60 seconds, after which samples whose resistance was 5 GΩ or more were given "○" and those whose resistance was less than 5 GΩ were given "X." Furthermore in the longevity-under-stress test (HALT), samples were set in a thermostatic chamber heated to 150° C. and then 20 V/μm of voltage was applied in equivalent electric field intensity across the dielectric layers between the alternately layered internal electrodes, and samples whose average longevity under stress to dielectric breakdown was 500 hours or more, 100 hours or more, and less than 100 hours, were given "⊚," "◯" and "X," respectively. The characteristics of obtained laminated ceramic capacitors are shown in Table 2.

TABLE 2

| Sample No. | Sintering property | Sintering temperature | Relative dielectric constant | tan δ | Temperature characteristics | 150-20 V/μm IR | HALT |
|---|---|---|---|---|---|---|---|
| 1 | ⊚ | 960° C. | 2320 | 4.2 | X7R | ◯ | ⊚ |
| 2 | ⊚ | 960° C. | 2740 | 6.8 | X7R | ◯ | ⊚ |
| 3 | ⊚ | 900° C. | 2350 | 4.5 | X7R | ◯ | ⊚ |
| 4 | ⊚ | 960° C. | 2380 | 4.1 | X7R | ◯ | ⊚ |
| 5 | ⊚ | 980° C. | 1520 | 1.5 | X7R | ◯ | ⊚ |
| 6 | ⊚ | 960° C. | 2680 | 7.4 | X7R | ◯ | ⊚ |
| 7 | ⊚ | 980° C. | 1680 | 1.4 | X5R | ◯ | ⊚ |
| 8 | ⊚ | 960° C. | 2640 | 6.3 | X7R | ◯ | ⊚ |
| 9 | ⊚ | 920° C. | 2980 | 7.7 | X7R | ◯ | ⊚ |
| 10 | ⊚ | 980° C. | 1860 | 2.3 | X5R | ◯ | ⊚ |
| 11 | ⊚ | 980° C. | 1850 | 1.3 | X7R | ◯ | ◯ |
| 12 | ⊚ | 980° C. | 2010 | 2.1 | X7R | ◯ | ◯ |
| 13 | ⊚ | 960° C. | 2270 | 2.9 | X7R | ◯ | ⊚ |
| 14 | ⊚ | 900° C. | 2250 | 4.0 | X7R | ◯ | ⊚ |
| 15 | ⊚ | 920° C. | 2360 | 5.5 | X7R | ◯ | ◯ |
| 16 | ⊚ | 960° C. | 2120 | 3.3 | X7R | ◯ | ◯ |
| 17 | ⊚ | 980° C. | 1720 | 1.5 | X7R | ◯ | ◯ |
| 18 | ⊚ | 960° C. | 2880 | 8.4 | X7R | ◯ | ⊚ |
| 19 | X | | | | | | |
| 20 | ◯ | 1020° C. | 1620 | 1.4 | X7R | ◯ | ⊚ |
| 21 | X | | | | | | |
| 22 | ⊚ | 960° C. | 2480 | 4.0 | X7R | ◯ | ⊚ |
| 23 | ⊚ | 960° C. | 2480 | 4.0 | X7R | ◯ | ⊚ |
| 24 | ⊚ | 960° C. | 2400 | 3.4 | X7R | ◯ | ⊚ |
| 25 | ⊚ | 920° C. | 1460 | 1.3 | X7R | ◯ | X |
| 26 | ⊚ | 980° C. | 2870 | 7.5 | X7R | ◯ | X |
| 27 | ⊚ | 920° C. | 1970 | 3.1 | X7R | ◯ | X |
| 28 | ⊚ | 880° C. | 2740 | 6.1 | X7R | ◯ | X |
| 29 | ⊚ | 960° C. | 2420 | 4.7 | X7R | ◯ | ⊚ |
| 30 | ⊚ | 980° C. | 1880 | 1.4 | X5R | ◯ | ⊚ |
| 31 | ⊚ | 960° C. | 2840 | 7.3 | X7R | ◯ | ⊚ |
| 32 | ⊚ | 960° C. | 2970 | 9.2 | X7R | ◯ | X |
| 33 | X | | | | | | |
| 34 | ⊚ | 880° C. | 2950 | 7.8 | X7R | ◯ | X |
| 35 | ◯ | 1020° C. | 1880 | 1.4 | X5R | ◯ | ⊚ |
| 36 | X | | | | | | |
| 37 | ⊚ | 980° C. | 1950 | 1.8 | X7R | ◯ | X |
| 38 | X | | | | | | |
| 39 | ⊚ | 900° C. | 3380 | 11.0 | X7R | ◯ | X |
| 40 | ⊚ | 900° C. | 2450 | 5.0 | X7R | ◯ | ⊚ |
| 41 | ⊚ | 940° C. | 2010 | 2.9 | X5R | ◯ | X |
| 42 | ⊚ | 940° C. | 2510 | 4.8 | X7R | ◯ | ⊚ |
| 43 | ◯ | 1010° C. | 2220 | 4.3 | X7R | ◯ | ⊚ |
| 44 | ⊚ | 900° C. | 2150 | 3.5 | X7R | ◯ | ⊚ |
| 45 | ⊚ | 960° C. | 2530 | 4.8 | X7R | ◯ | ⊚ |
| 46 | ⊚ | 960° C. | 2280 | 3.6 | X7R | ◯ | ⊚ |
| 47 | ⊚ | 900° C. | 2150 | 4.0 | X7R | ◯ | ⊚ |
| 48 | ⊚ | 960° C. | 2270 | 2.9 | X7R | ◯ | X |
| 49 | ⊚ | 980° C. | 1430 | 1.4 | X7R | ◯ | X |
| 50 | ⊚ | 960° C. | 2590 | 6.9 | X7R | ◯ | X |
| 51 | ⊚ | 920° C. | 2910 | 7.2 | X7R | ◯ | X |
| 52 | ⊚ | 980° C. | 1780 | 1.9 | X7R | ◯ | X |
| 53 | ⊚ | 980° C. | 1650 | 1.3 | X7R | ◯ | X |
| 54 | ⊚ | 960° C. | 2760 | 7.4 | X7R | ◯ | X |
| 55 | ⊚ | 960° C. | 2310 | 4.1 | X7R | ◯ | ⊚ |
| 56 | ⊚ | 960° C. | 2400 | 3.8 | X7R | ◯ | ⊚ |
| 57 | ⊚ | 900° C. | 2210 | 3.8 | X7R | ◯ | ⊚ |
| 58 | ⊚ | 980° C. | 2830 | 5.3 | X7R | ◯ | X |
| 59 | ⊚ | 960° C. | 2820 | 7.1 | X7R | ◯ | ⊚ |
| 60 | ⊚ | 940° C. | 2510 | 4.8 | X7R | ◯ | ⊚ |
| 61 | ⊚ | 960° C. | 2450 | 4.5 | X7R | ◯ | ⊚ |
| 62 | ⊚ | 980° C. | 1500 | 1.4 | X7R | ◯ | ⊚ |
| 63 | ⊚ | 960° C. | 2690 | 7.3 | X7R | ◯ | ⊚ |
| 64 | ⊚ | 980° C. | 2810 | 6.9 | X7R | ◯ | ⊚ |
| 65 | ⊚ | 980° C. | 1840 | 2.1 | X5R | ◯ | ⊚ |
| 66 | X | | | | | | |
| 67 | ⊚ | 1000° C. | 2450 | 3.5 | X7R | ◯ | ⊚ |
| 68 | ⊚ | 980° C. | 1900 | 1.4 | X5R | ◯ | ⊚ |
| 69 | ⊚ | 980° C. | 2330 | 4.5 | X7R | ◯ | ⊚ |
| 70 | ⊚ | 940° C. | 2500 | 4.8 | X7R | ◯ | ⊚ |

Example 2

Dielectric powders were prepared to the compositions shown in Table 3 using the same method described in Example 1, and checked for sintering property.

TABLE 3

| Sample No. | n | Re | a Re2O3 | b MnO | c V2O5 | d MoO3 | e CuO | f B2O3 | g Li2O | h SiO2 | i BaO | j SrO | k CaO | Internal electrode | m | c + d | (100(m − 1) + 2g)/2f | 100(m − 1)/2g |
|---|---|---|---|---|---|---|---|---|---|---|---|---|---|---|---|---|---|---|
| 71 | 0.992 | Dy | 0.25 | 0.40 | 0.05 | 0.05 | 0.00 | 1.30 | 0.43 | 0.00 | 1.37 | 0.86 | | Cu | 1.014 | 0.10 | 0.88 | 1.66 |
| 72 | 0.994 | Ho | 0.20 | 0.40 | 0.01 | 0.03 | 0.00 | 0.65 | 0.36 | 0.00 | 0.57 | 0.57 | | Cu | 1.005 | 0.04 | 0.97 | 0.76 |
| 73 | 1.001 | Gd | 0.25 | 0.60 | 0.01 | 0.07 | 0.00 | 0.98 | 0.32 | 0.00 | 0.17 | 0.56 | 0.40 | Cu | 1.012 | 0.08 | 0.95 | 1.86 |
| 74 | 1.001 | Gd | 0.35 | 0.20 | 0.01 | 0.03 | 0.00 | 0.98 | 0.19 | 0.00 | 1.26 | 0.15 | | Cu | 1.015 | 0.04 | 0.95 | 4.00 |
| 75 | 1.001 | Gd | 0.25 | 0.40 | 0.05 | 0.05 | 0.00 | 1.30 | 0.43 | 0.00 | 1.37 | | 0.16 | Cu | 1.016 | 0.10 | 0.95 | 1.86 |
| 76 | 1.001 | Gd | 0.35 | 0.20 | 0.07 | 0.03 | 0.00 | 1.30 | 0.50 | 0.00 | 0.30 | 1.49 | | Cu | 1.019 | 0.10 | 1.10 | 1.86 |
| 77 | 1.002 | Gd | 0.25 | 0.60 | 0.05 | 0.03 | 0.00 | 0.65 | 0.10 | 0.00 | 0.10 | 0.67 | | Cu | 1.010 | 0.08 | 0.90 | 4.63 |
| 78 | 1.003 | Gd | 0.35 | 0.40 | 0.05 | 0.07 | 0.00 | 0.65 | 0.12 | 0.00 | 0.42 | 0.49 | | Cu | 1.012 | 0.12 | 1.13 | 4.93 |
| 79 | 1.003 | Gd | 0.35 | 0.40 | 0.01 | 0.07 | 0.00 | 1.30 | 0.52 | 0.00 | 0.14 | 0.83 | | Cu | 1.013 | 0.08 | 0.89 | 1.22 |

Each dielectric powder obtained as above was mixed with PVB binder or acrylic binder, plasticizer, and organic solvent as medium, as deemed appropriate, to prepare a ceramic slurry, after which a reverse roll coater, etc., was used to apply this ceramic slurry on polyester films to a thickness of 7 μm to prepare green sheets. Thereafter, the green sheets were cut to the specified dimensions to obtain rectangular ceramic green sheets. Screen printing or other method was used to print the obtained rectangular ceramic green sheets with an internal electrode paste whose primary component is Cu, to form conductive patterns. Next, multiple ceramic green sheets on which conductive patterns were formed were layered in the specified direction. In doing so, the ceramic green sheets were arranged in such a way that the printed sides of the adjacent pair of ceramic green sheets on top and bottom would be displaced by approx. one half the internal electrode patterns in the lengthwise direction of the patterns. Furthermore, ceramic green sheets for protective layers having no internal electrode pattern printed on them were layered and pressure-bonded on both the top face and bottom face of the laminate. Thereafter, the laminate was cut to the specified shape to prepare a ceramic laminate. Next, an external electrode paste was applied on the end faces of the cut-out ceramic laminate where the internal electrodes 3 were exposed, and then dried and binder-removed at 300 to 600° C. in an inert ambience (inert enough not to oxidize Cu), after which the temperature was raised at a rate of 300° C. per hour to the specified sintering temperature (940 to 1030° C.) in an ambience of $N_2$: 98%-$H_2$: 2% gas containing water vapor, and once the sintering temperature was reached, it was held for 2 hours and then the temperature was lowered at a rate of 300° C. per hour and at approx. 700° C., the ambience was replaced with nitrogen and the nitrogen ambience was held for 2 hours, after which the temperature was lowered to room temperature to form a laminated ceramic sintered compact and external electrodes 4 simultaneously. The obtained laminated ceramic capacitor was evaluated in the same manner as in Example 1, the results of which are shown in Table 4. As shown in Table 4, the specified characteristics can be achieved also when external electrodes and dielectric layers are sintered simultaneously.

TABLE 4

| Sample No. | Sintering property | Sintering temperature | Relative dielectric constant | tan δ | Temperature characteristics | 150-20 V/um IR | HALT |
|---|---|---|---|---|---|---|---|
| 71 | ⊚ | 960° C. | 2380 | 3.5 | X7R | ○ | ⊚ |
| 72 | ⊚ | 940° C. | 2320 | 3.9 | X7R | ○ | ⊚ |
| 73 | ⊚ | 980° C. | 1720 | 1.5 | X7R | ○ | ⊚ |
| 74 | ⊚ | 960° C. | 2880 | 8.4 | X7R | ○ | ⊚ |
| 75 | ⊚ | 960° C. | 2480 | 4.0 | X7R | ○ | ⊚ |
| 76 | ⊚ | 960° C. | 2820 | 6.9 | X7R | ○ | ⊚ |
| 77 | ⊚ | 980° C. | 1880 | 1.4 | X5R | ○ | ⊚ |
| 78 | ⊚ | 960° C. | 2420 | 4.7 | X7R | ○ | ⊚ |
| 79 | ⊚ | 900° C. | 2450 | 5.0 | X7R | ○ | ⊚ |

As described above, with a dielectric ceramic composition constituted by a $BaTiO_3$ primary component that will constitute dielectric layers in a laminated ceramic capacitor, and by auxiliary components constituted by Re, Mn, V, Mo, Cu, B, Li, Sr, and Ca, specifying the contents of the components that constitute the composition and other conditions as mentioned above achieves a laminated ceramic capacitor which can be sintered at a low temperature of 1080° C. or below without containing lead, bismuth, or other substance harmful to the environment or to the human body in its composition, which can be co-sintered with metals primarily constituted by Cu and offering excellent electrical conductivity, which has high dielectric constant and also exhibits sufficient dielectric characteristics to satisfy X7R characteristics (or X5R characteristics) due to use of Cu in the internal electrodes, and which offers high insulation resistance and excellent longevity traits under high-temperature load, etc., even when sintered in a reducing ambience.

Description of the Symbols

1: Laminated ceramic capacitor, 2: Dielectric layer, 3: Internal electrode, 4: External electrode

What is claimed is:

1. A dielectric ceramic composition constituted by a primary component constituted by $BaTiO_3$ and auxiliary components constituted by Re, Mn, V, Mo, Cu, B, Li, Ca, and Sr, wherein it is expressed by $BaTiO_3+aRe_2O_3+bMnO+cV_2O_5+dMoO_3+eCuO+fB_2O_3+gLi_2O+xSrO+yCaO$ (where Re represents at least one type of element selected from Eu, Gd, Dy, Ho, Er, Yb, and Y, and a to g, x, and y represent mol numbers relative to 100 mol of the primary component constituted by $BaTiO_3$) and, when a mol ratio of (Ba+Sr+Ca)/Ti contained in the dielectric ceramic composition is given by m, $0.10 \le a \le 0.50$, $0.20 \le b \le 0.80$, $0 \le c \le 0.12$, $0 \le d \le 0.07$, $0.04 \le c+d \le 0.12$, $0 \le e \le 1.00$, $0.50 \le f \le 2.00$, $0.6 \le (100 (m-1) +2g)/2f \le 1.3$, $0.5 \le 100 (m-1)/2 g \le 5.1$, $0 \le x \le 1.5$, and $0 \le y \le 1.5$.

2. A dielectric ceramic composition according to claim 1, wherein Si contained as impurity accounts for 1.0 mol or less in equivalent $SiO_2$ relative to 100 mol of the primary component constituted by $BaTiO_3$.

3. A dielectric ceramic composition according to claim 2, wherein it is expressed by $(Ba_{1-v-w}Sr_vCa_w)TiO_3+aRe_2O_3+bMnO+cV_2O_5+dMoO_3+eCuO+fB_2O_3+gLi_2O+xSrO+yCaO$, where $0 \le x+v \times 100 \le 1.5$ and $0 \le y+w \times 100 \le 1.5$.

4. A laminated ceramic capacitor comprising multiple dielectric ceramic layers as well as internal electrodes formed between the dielectric ceramic layers in a manner opposing each other, wherein the dielectric ceramic layer is a sintered compact constituted by a dielectric ceramic composition according to claim 3 and that the internal electrode is constituted by Cu or Cu alloy.

5. A laminated ceramic capacitor according to claim 4, wherein the internal electrodes which are formed between the dielectric ceramic layers in a manner opposing each other are led out alternately to different end faces; and the laminated ceramic capacitor further comprises external electrodes which are formed on both end faces of the dielectric ceramic layers and each connected electrically to the internal electrodes.

6. A laminated ceramic capacitor comprising multiple dielectric ceramic layers as well as internal electrodes formed between the dielectric ceramic layers in a manner opposing each other, wherein the dielectric ceramic layer is a sintered compact constituted by a dielectric ceramic composition according to claim 2 and that the internal electrode is constituted by Cu or Cu alloy.

7. A laminated ceramic capacitor according to claim 6, wherein the internal electrodes which are formed between the dielectric ceramic layers in a manner opposing each other are led out alternately to different end faces; and the laminated ceramic capacitor further comprises external electrodes which are formed on both end faces of the dielectric ceramic layers and each connected electrically to the internal electrodes.

8. A dielectric ceramic composition according to claim 1, wherein it is expressed by $(Ba_{1-v-w}Sr_vCa_w)TiO_3+aRe_2O_3+bMnO+cV_2O_5+dMoO_3+eCuO+fB_2O_3+gLi_2O+xSrO+yCaO$, where $0 \le x+v \times 100 \le 1.5$ and $0 \le y+w \times 100 \le 1.5$.

9. A laminated ceramic capacitor comprising multiple dielectric ceramic layers as well as internal electrodes formed between the dielectric ceramic layers in a manner opposing each other, wherein the dielectric ceramic layer is a sintered compact constituted by a dielectric ceramic composition according to claim 8 and that the internal electrode is constituted by Cu or Cu alloy.

10. A laminated ceramic capacitor according to claim 9, wherein the internal electrodes which are formed between the dielectric ceramic layers in a manner opposing each other are led out alternately to different end faces; and the laminated ceramic capacitor further comprises external electrodes which are formed on both end faces of the dielectric ceramic layers and each connected electrically to the internal electrodes.

11. A dielectric ceramic composition according to claims 1, wherein it can be made denser at a sintering temperature of 1030° C. or below.

12. A laminated ceramic capacitor comprising multiple dielectric ceramic layers as well as internal electrodes formed between the dielectric ceramic layers in a manner opposing each other, wherein the dielectric ceramic layer is a sintered compact constituted by a dielectric ceramic composition according to claim 11 and that the internal electrode is constituted by Cu or Cu alloy.

13. A laminated ceramic capacitor according to claim 12, wherein the internal electrodes which are formed between the dielectric ceramic layers in a manner opposing each other are led out alternately to different end faces; and the laminated ceramic capacitor further comprises external electrodes which are formed on both end faces of the dielectric ceramic layers and each connected electrically to the internal electrodes.

14. A laminated ceramic capacitor comprising multiple dielectric ceramic layers as well as internal electrodes formed between the dielectric ceramic layers in a manner opposing each other, wherein the dielectric ceramic layer is a sintered compact constituted by a dielectric ceramic composition according to claim 1 and that the internal electrode is constituted by Cu or Cu alloy.

15. A laminated ceramic capacitor according to claim 14, wherein the internal electrodes which are formed between the dielectric ceramic layers in a manner opposing each other are led out alternately to different end faces; and the laminated ceramic capacitor further comprises external electrodes which are formed on both end faces of the dielectric ceramic layers and each connected electrically to the internal electrodes.

16. A method of manufacturing a laminated ceramic capacitor according to claim 14, comprising: a step to prepare a ceramic material which contains a primary component material constituted by a $BaTiO_3$ compound as well as auxiliary component materials including at least Re (here, Re represents at least one type of element selected from the group that includes Eu, Gd, Dy, Ho, Er, Yb, and Y), Mn, B, and Li, and at least one of V and Mo, or further Cu, Ba, Sr, and Ca, in the form of oxide, glass, or other compound; a sheet-forming step where the ceramic material is used to form ceramic green sheets; a printing step where internal electrode patterns whose primary component is Cu are printed on the ceramic green sheets; a lamination step where the ceramic green sheets completing the printing step are layered to form a laminate; a cutting step where the laminate is cut to each internal electrode pattern to obtain a chip-shaped laminate; a sintering step where the chip-shaped laminate obtained by the cutting step is sintered in a reducing ambience at a temperature of 1030° C. or below to obtain a sintered compact; and an external electrode-forming step where a conductive external electrode paste is applied on both ends of the sintered compact in a manner electrically connecting the internal electrodes, followed by baking.

17. A method of manufacturing a laminated ceramic capacitor according to claim 14, comprising: a step to prepare a ceramic material which contains a primary component material constituted by a $BaTiO_3$ compound as well as auxiliary component materials including at least Re (here, Re represents at least one type of element selected from Eu, Gd, Dy, Ho, Er, Yb, and Y), Mn, B, and Li, and at least one of V and Mo, or further Cu, Ba, Sr, and Ca, in the form of oxide, glass, or other compound; a sheet-forming step where the ceramic material is used to form ceramic green sheets; a printing step where internal electrode patterns whose primary component is Cu are printed on the ceramic green sheets; a lamination step where the ceramic green sheets completing the printing step are layered to form a laminate; a cutting step where the laminate is cut to each internal electrode pattern to obtain a chip-shaped laminate; an external electrode-forming step where a conductive external electrode paste is applied on both ends of the chip-shaped laminate obtained by the cutting step in a manner electrically connecting the internal electrodes; and a sintering step where the chip-shaped laminate obtained by the external electrode-forming step is sintered in a reducing ambience at a temperature of 1030° C. or below.

* * * * *